(12) United States Patent
Li et al.

(10) Patent No.: US 6,900,933 B1
(45) Date of Patent: May 31, 2005

(54) INTEGRATED TWO-PUMP COMBINER FOR OPTICAL FIBER AMPLIFIERS

(75) Inventors: Wei-Zhong Li, San Jose, CA (US); Qingdong Guo, Sunnyvale, CA (US)

(73) Assignee: Oplink Communications, Inc., Fremont, CA (US)

(*) Notice: Subject to any disclaimer, the term of this patent is extended or adjusted under 35 U.S.C. 154(b) by 80 days.

(21) Appl. No.: 10/131,561

(22) Filed: Apr. 23, 2002

(51) Int. Cl.$^7$ ............................................. H01S 3/00
(52) U.S. Cl. ............................................. 359/341.32
(58) Field of Search ........................... 359/494, 495, 359/341.32, 334, 341.33

(56) References Cited

U.S. PATENT DOCUMENTS

| | | | |
|---|---|---|---|
| 4,548,478 A | 10/1985 | Shirasaki | 350/377 |
| 5,402,509 A | 3/1995 | Fukushima | 385/33 |
| 5,408,354 A | 4/1995 | Hosokawa | 359/281 |
| 5,493,440 A | 2/1996 | Souda et al. | 359/341 |
| 5,499,132 A * | 3/1996 | Tojo et al. | 359/281 |
| 5,606,439 A | 2/1997 | Wu | 349/117 |
| 5,930,039 A | 7/1999 | Li et al. | 359/484 |
| 6,052,228 A | 4/2000 | Xie et al. | 359/496 |
| 6,061,167 A | 5/2000 | Song | 359/256 |
| 6,212,313 B1 | 4/2001 | Li | 385/24 |
| 6,282,025 B1 | 8/2001 | Huang et al. | 359/495 |
| 6,310,989 B1 | 10/2001 | Liu | 385/11 |
| 6,331,913 B1 | 12/2001 | Huang et al. | 359/497 |
| 6,339,661 B1 | 1/2002 | Kokkelink et al. | 385/11 |
| 6,404,542 B1 * | 6/2002 | Ziari et al. | 359/341.3 |
| 6,466,704 B1 | 10/2002 | Frisken | 385/11 |
| 6,480,331 B1 | 11/2002 | Cao | 359/484 |
| 6,507,422 B1 | 1/2003 | Fukushima | 359/124 |
| 6,522,796 B1 * | 2/2003 | Ziari et al. | 385/11 |
| 6,608,723 B2 * | 8/2003 | Xie | 359/618 |
| 6,628,455 B1 * | 9/2003 | Lee | 359/341.32 |
| 6,628,461 B2 * | 9/2003 | Huang et al. | 359/494 |
| 6,813,397 B2 * | 11/2004 | Lin | 385/11 |
| 2001/0053022 A1 | 12/2001 | Tai et al. | 359/484 |
| 2002/0008901 A1 * | 1/2002 | Kinoshita | 359/341.1 |
| 2002/0060843 A1 | 5/2002 | Huang et al. | 359/484 |
| 2002/0191289 A1 | 12/2002 | Chuang | 359/495 |

* cited by examiner

*Primary Examiner*—Thomas H. Tarcza
*Assistant Examiner*—Deandra M. Hughes
(74) *Attorney, Agent, or Firm*—Fish & Richardson P.C.

(57) ABSTRACT

An integrated optical fiber amplifier system includes a non-reciprocal combination-device and an optical fiber amplifier. The non-reciprocal combination-device includes a first birefringent wedge, a second birefringent wedge, and a non-reciprocal rotating element. The optical fiber amplifier is optically coupled to the first birefringent wedge for receiving a combined pump light from the non-reciprocal combination-device.

50 Claims, 11 Drawing Sheets

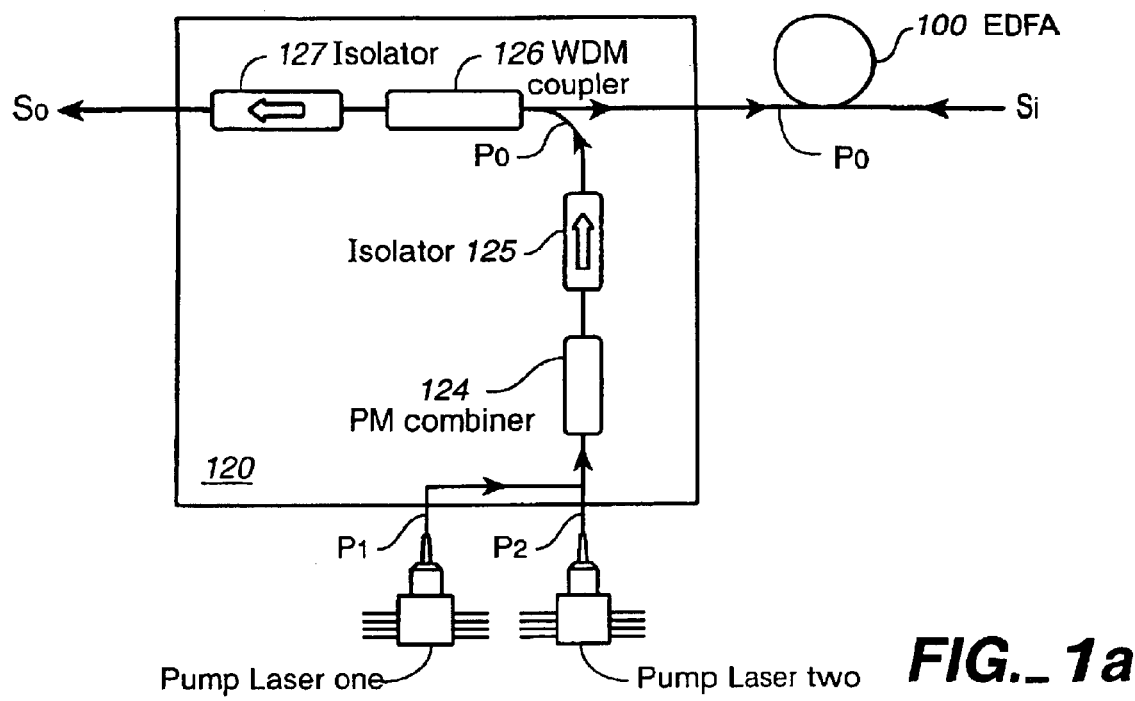
FIG._1a
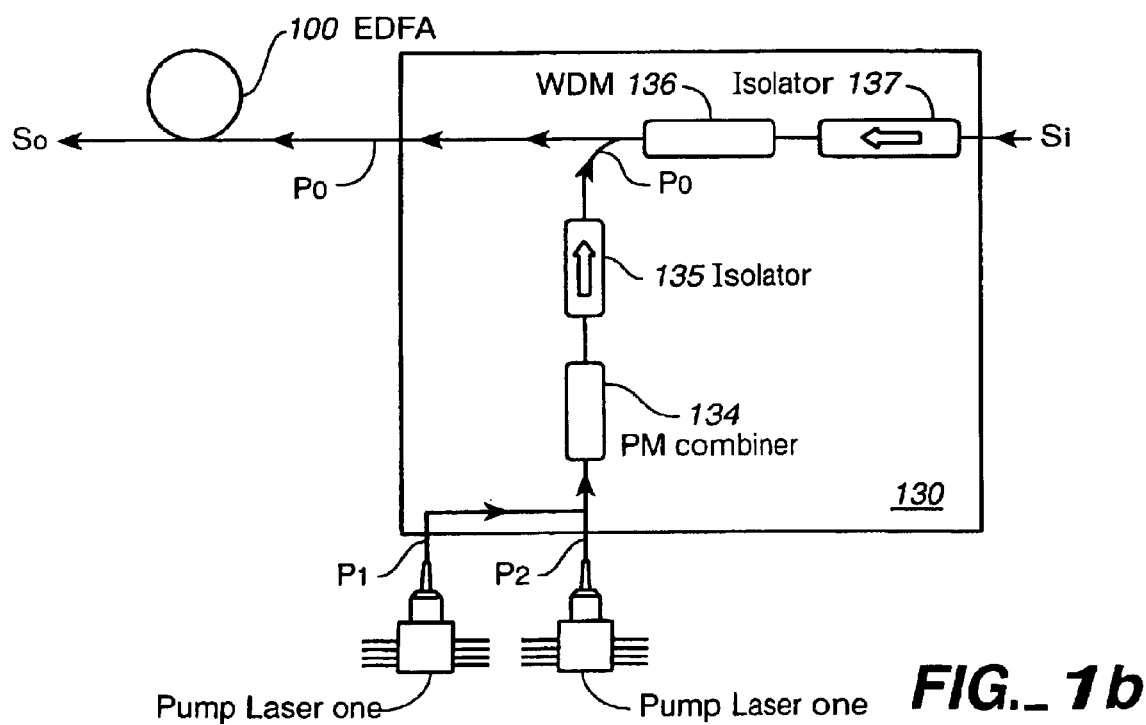
FIG._1b

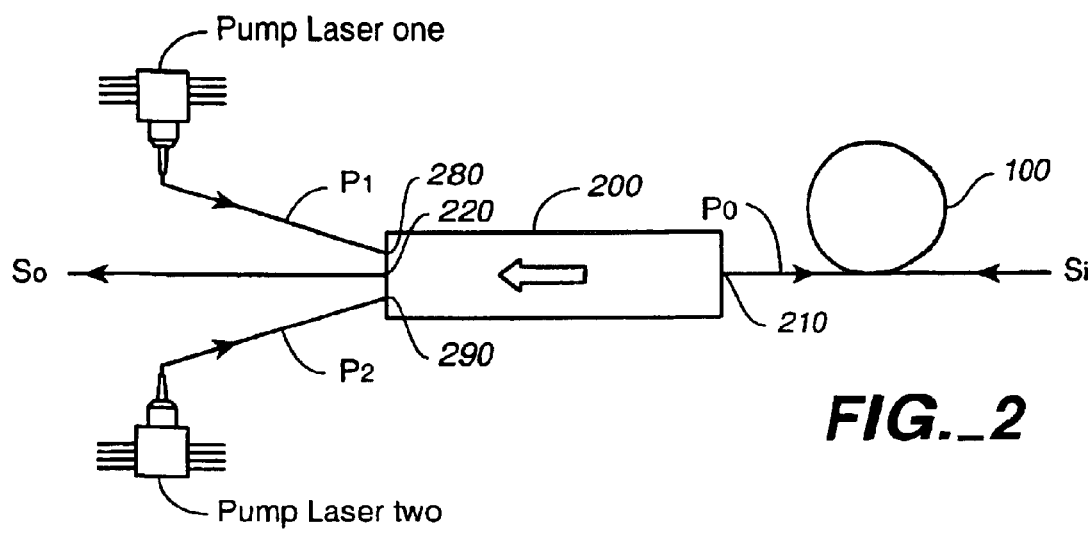
FIG._2
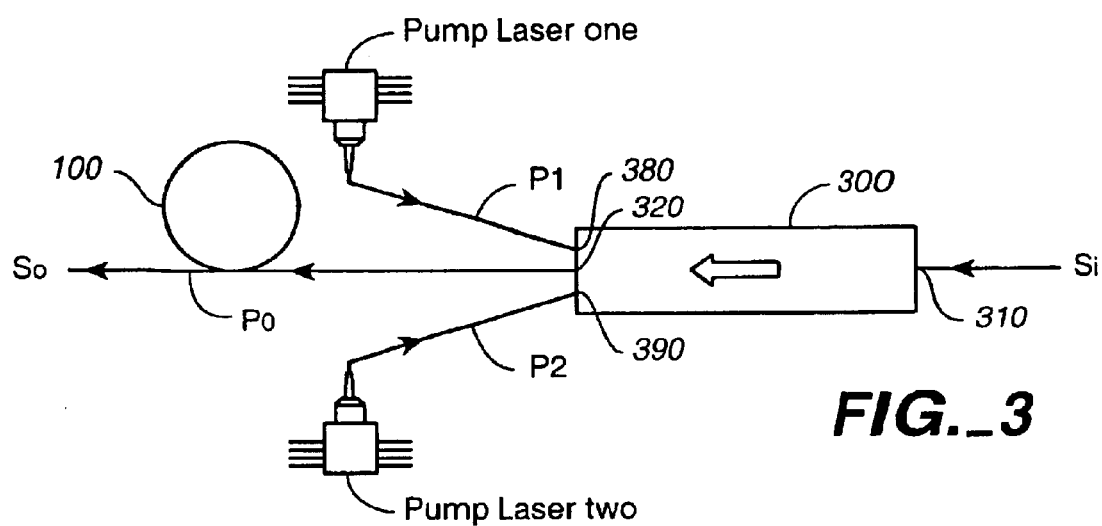
FIG._3

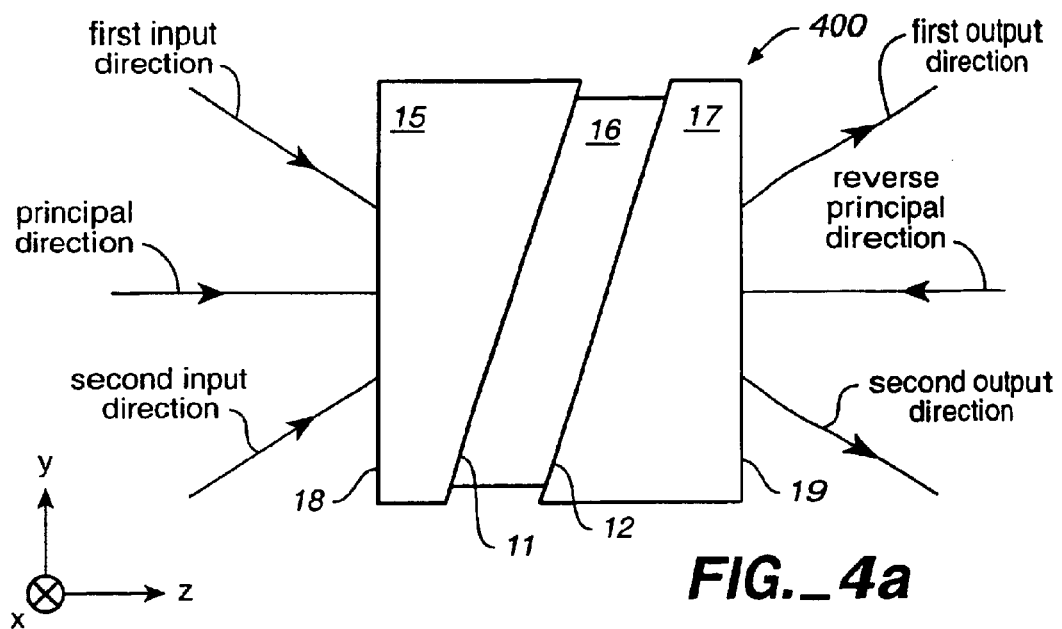
FIG._4a
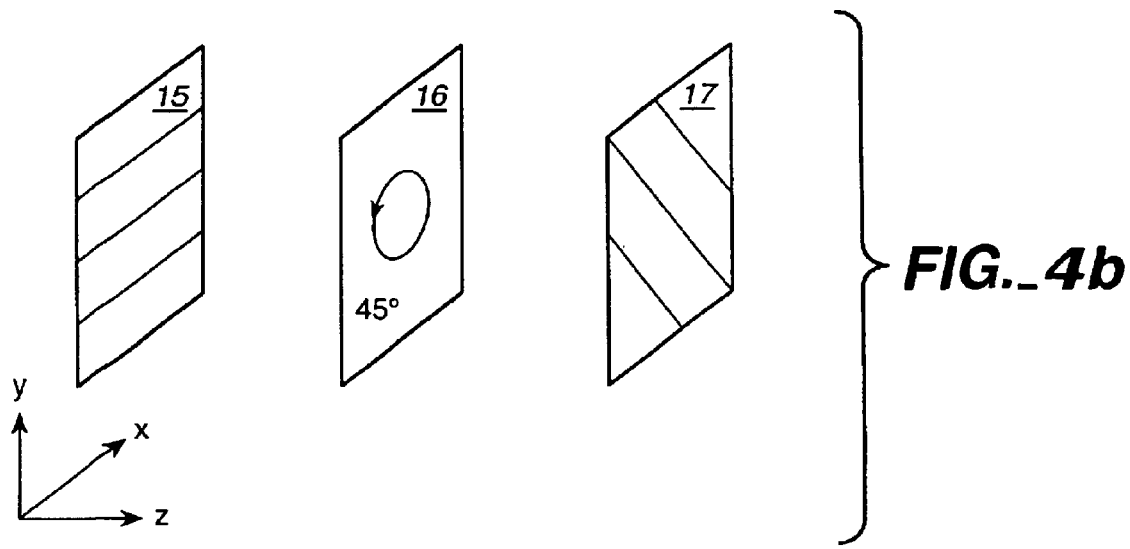
FIG._4b

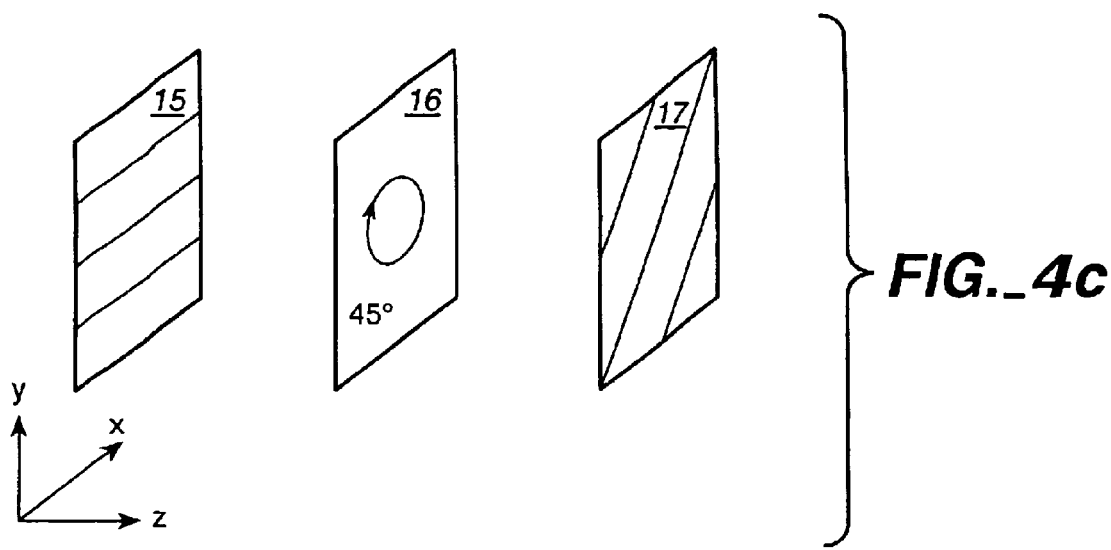
FIG._4c
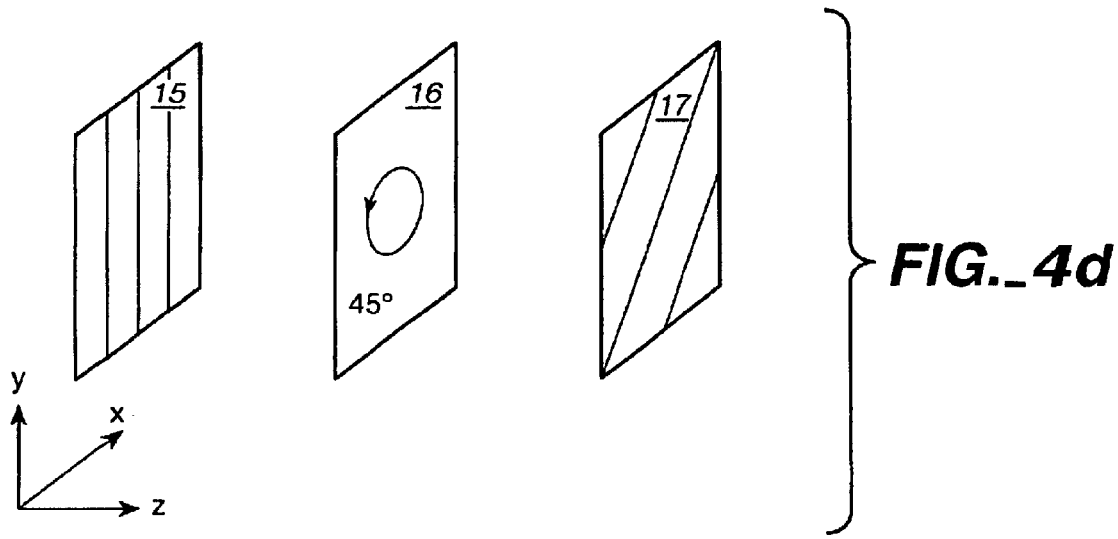
FIG._4d
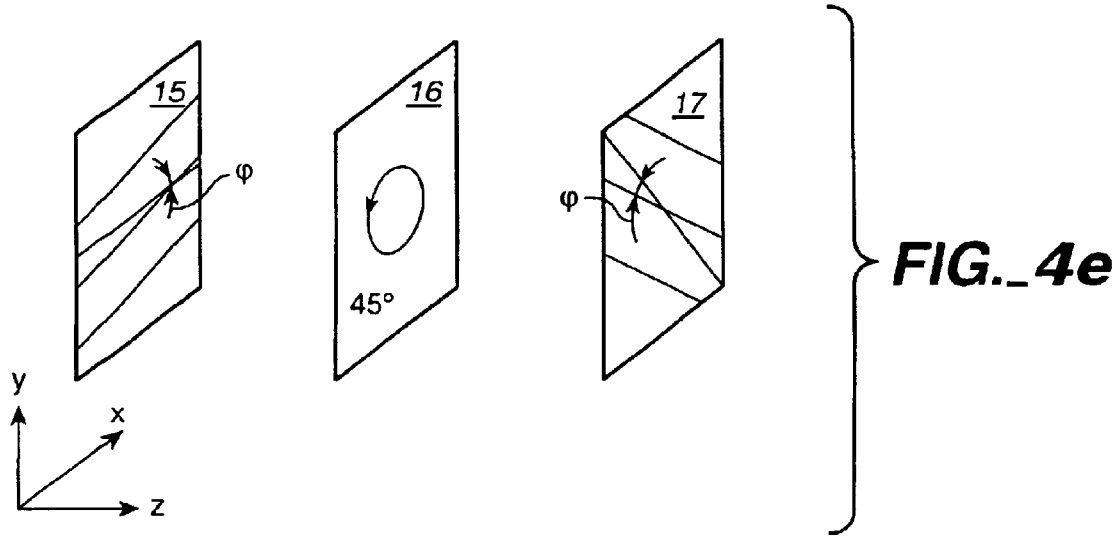
FIG._4e

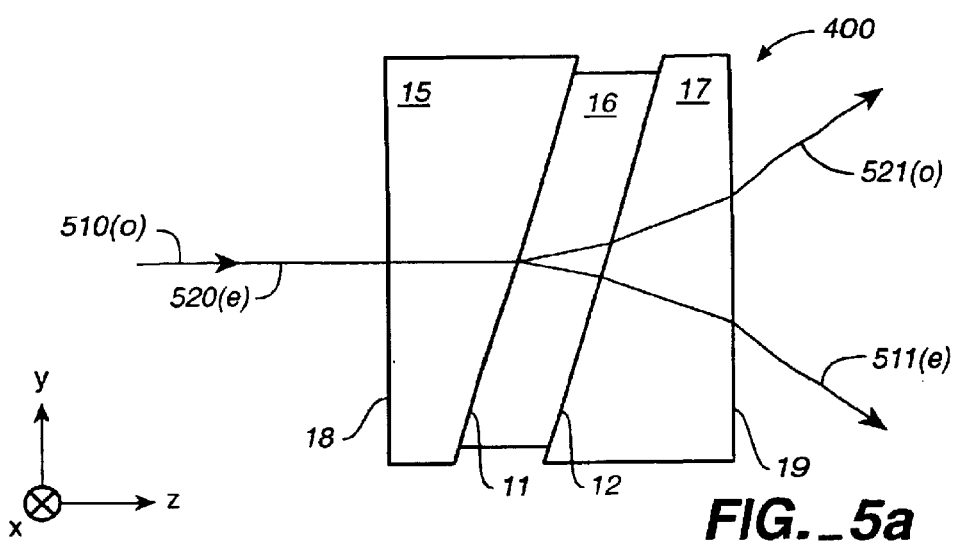
FIG._5a
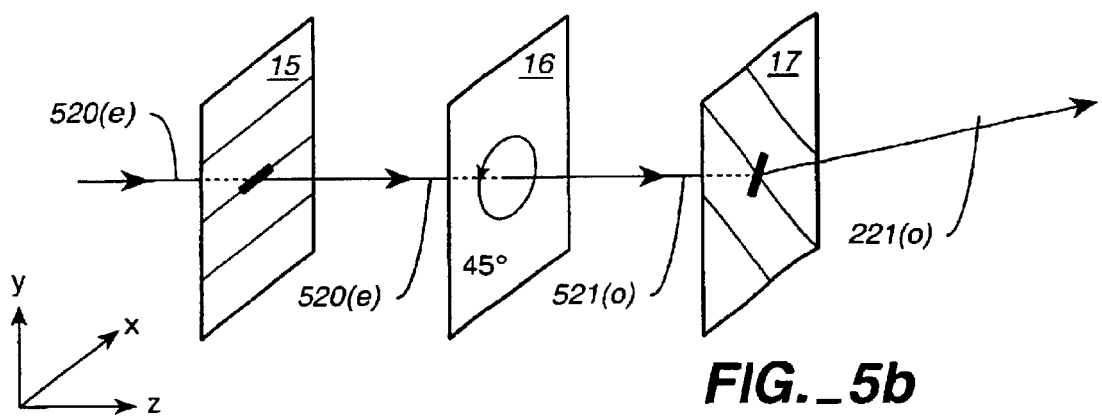
FIG._5b
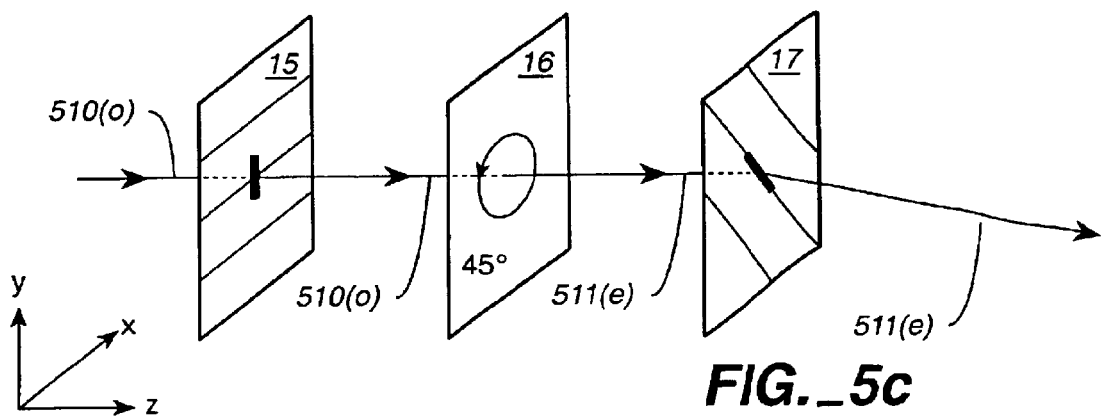
FIG._5c

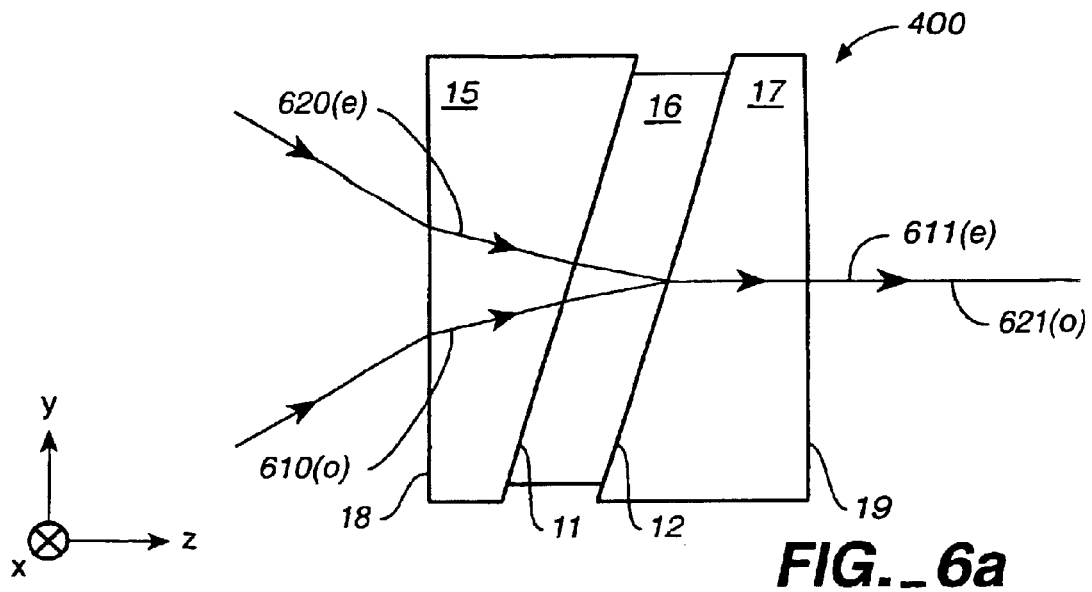
FIG._6a
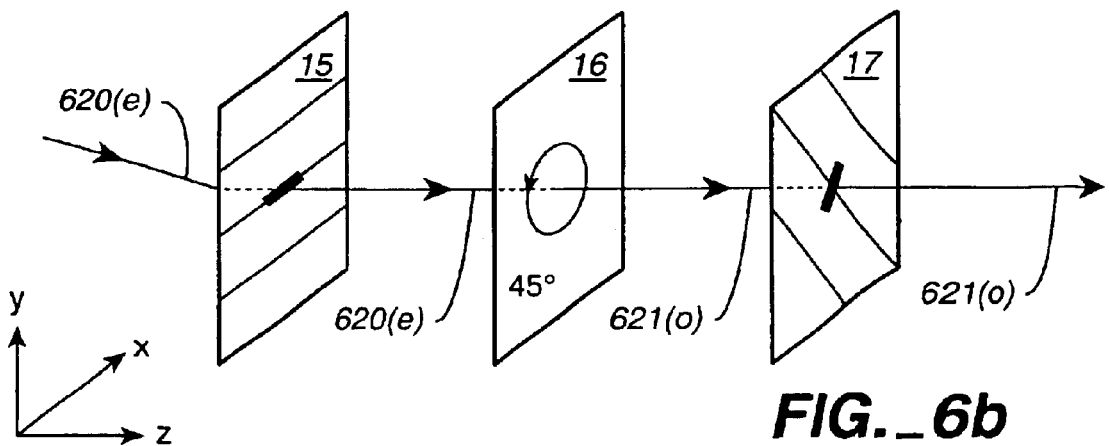
FIG._6b
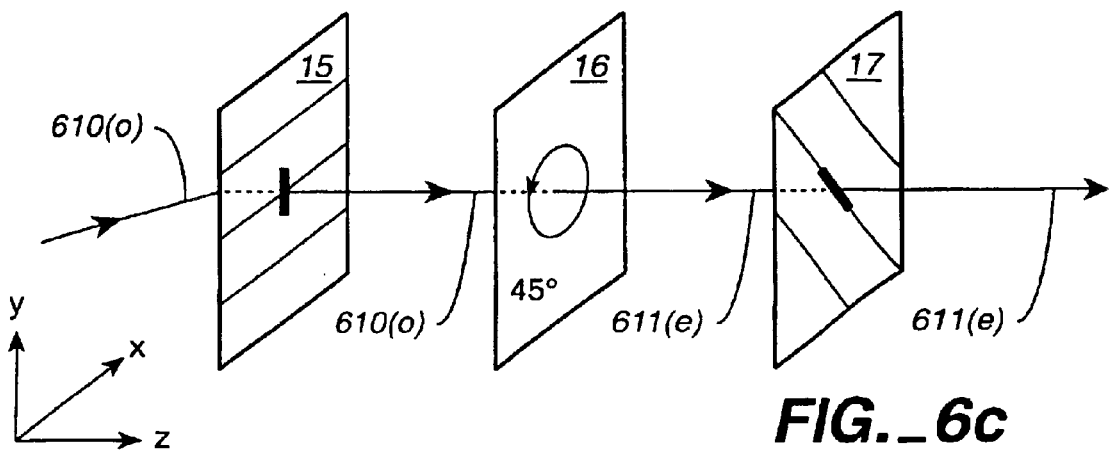
FIG._6c

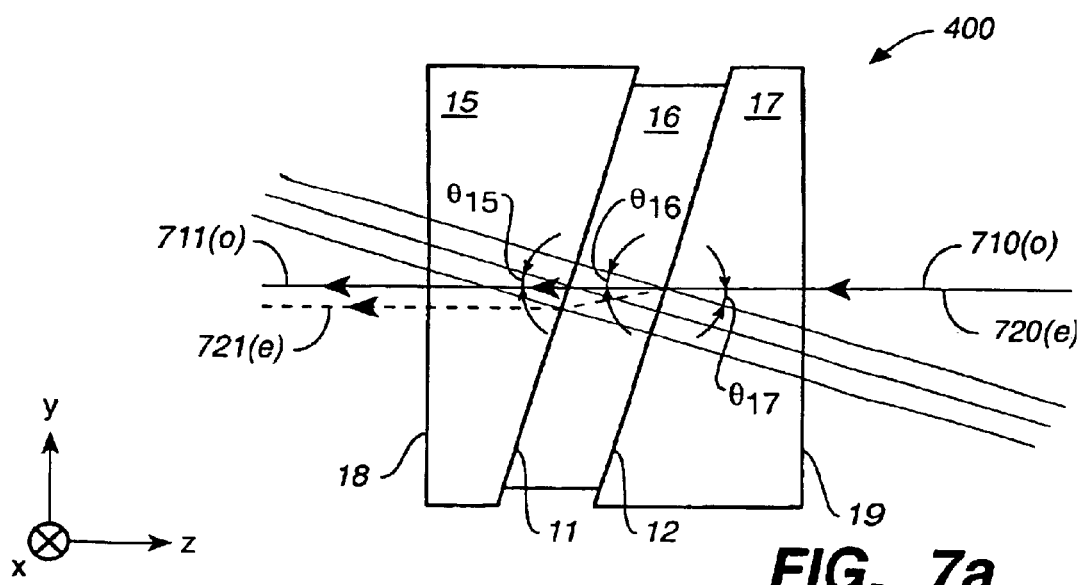
FIG._7a
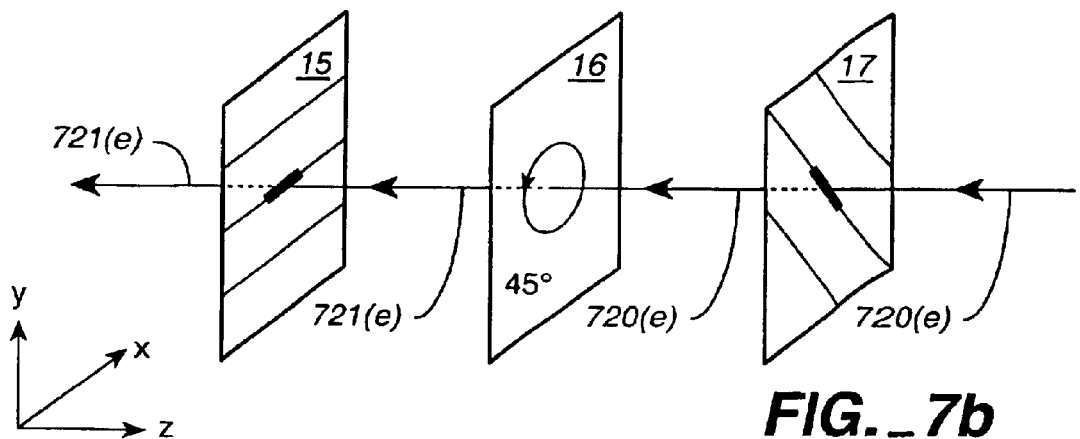
FIG._7b
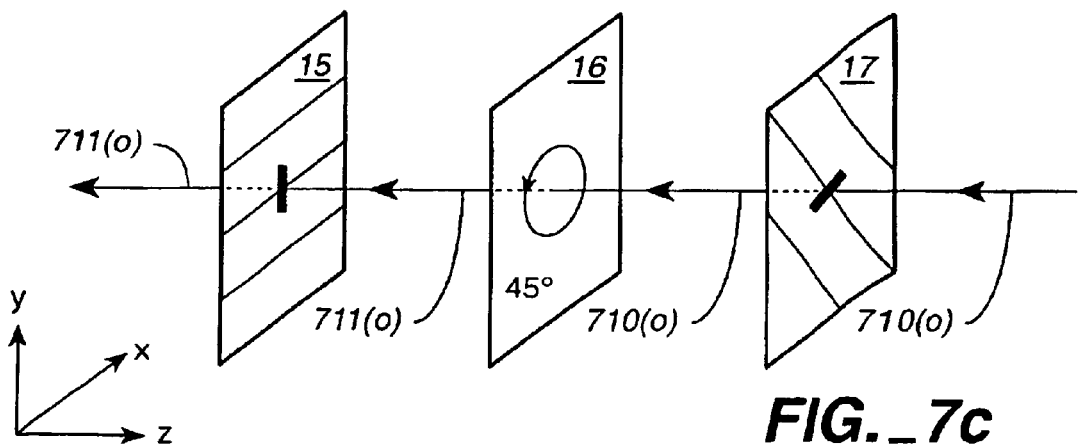
FIG._7c

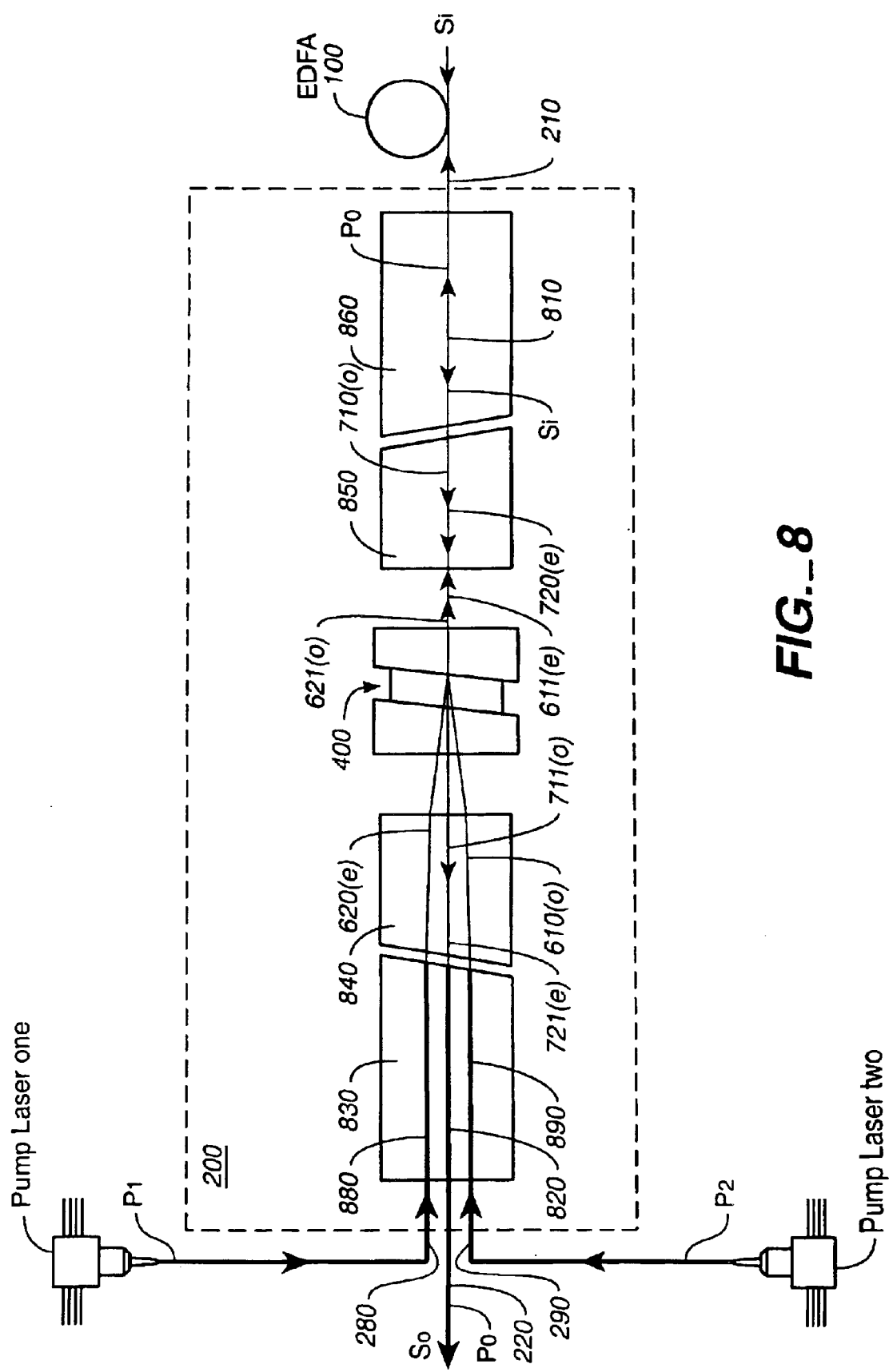
FIG._8

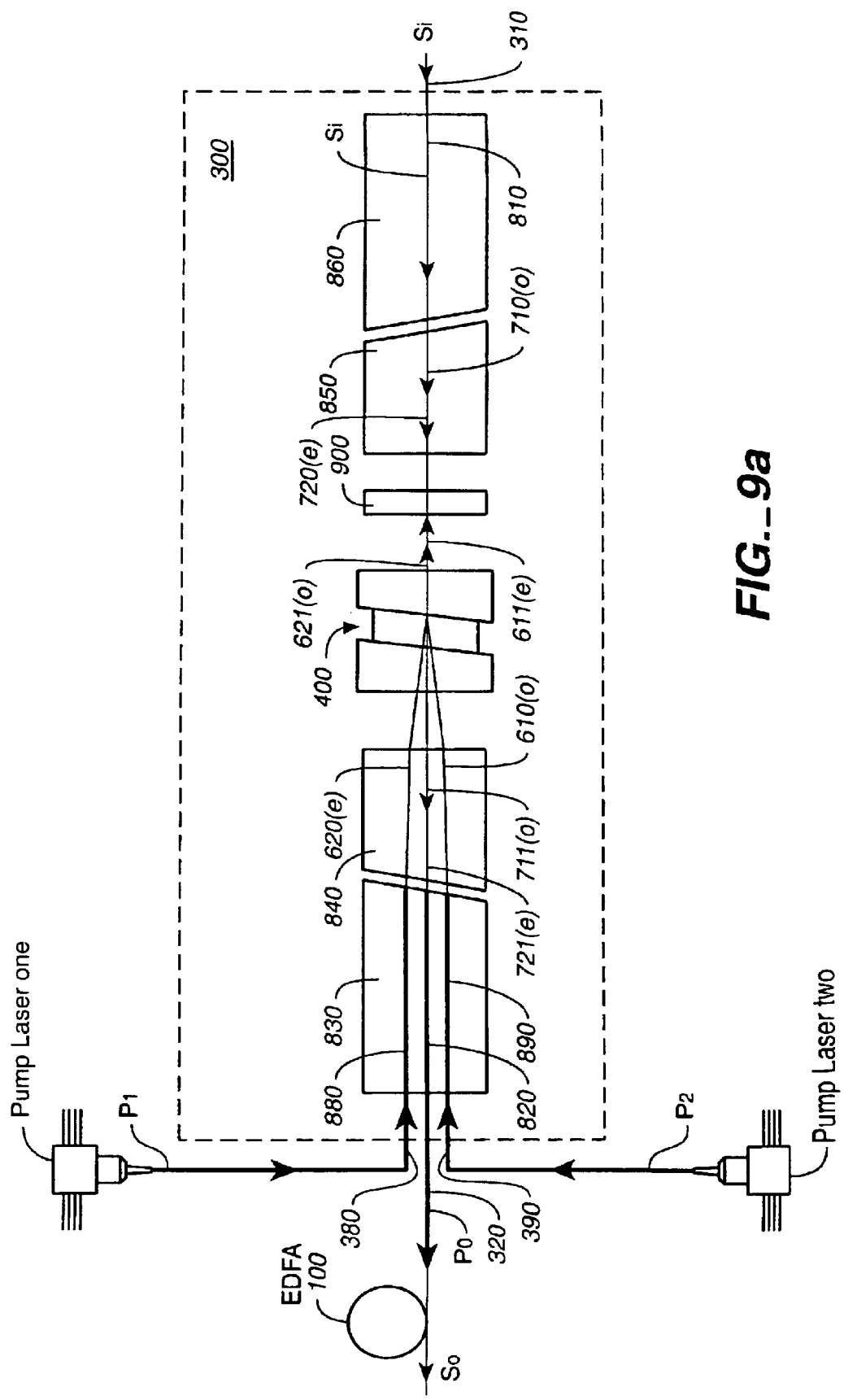
FIG._9a

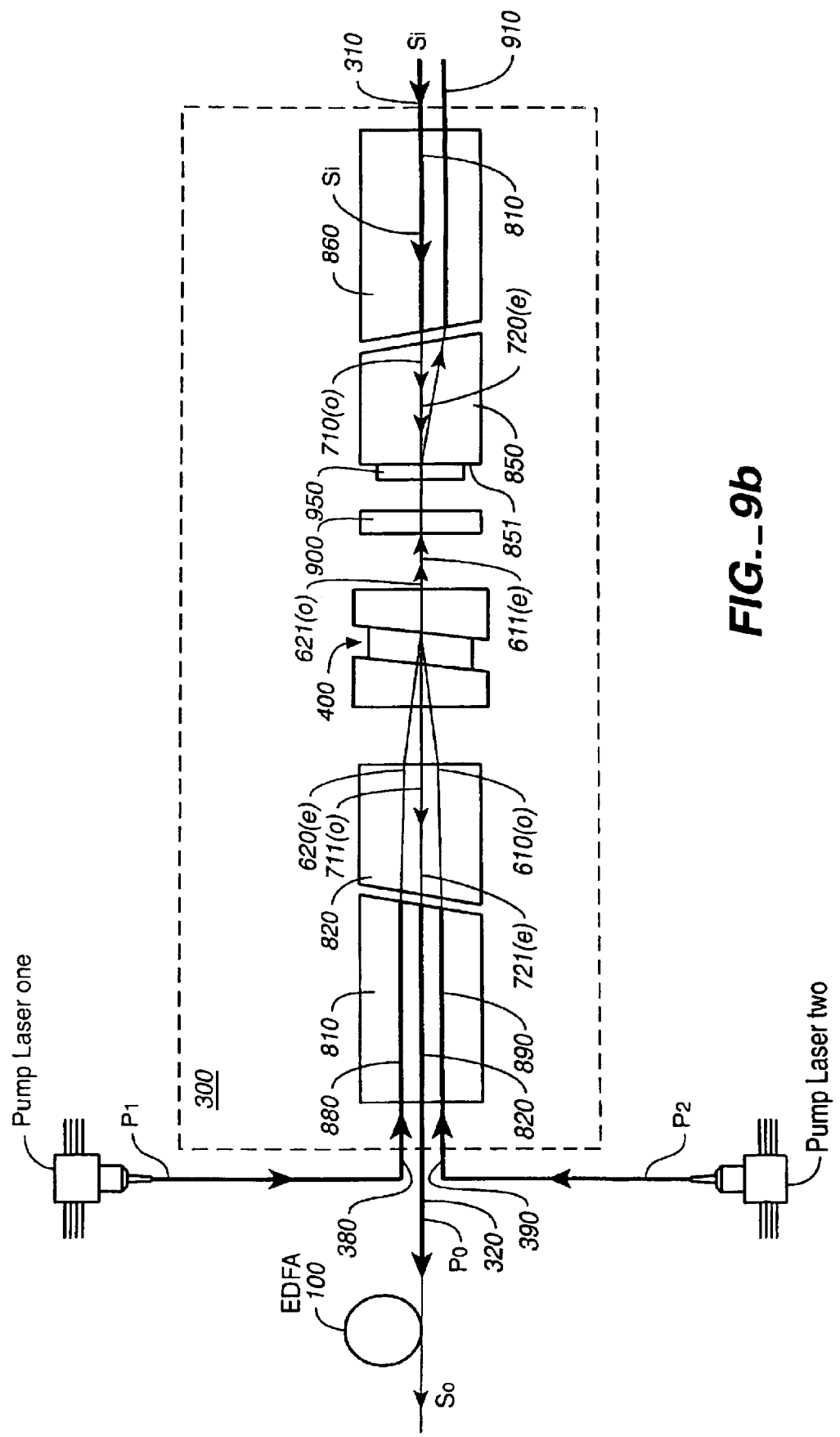
FIG._9b

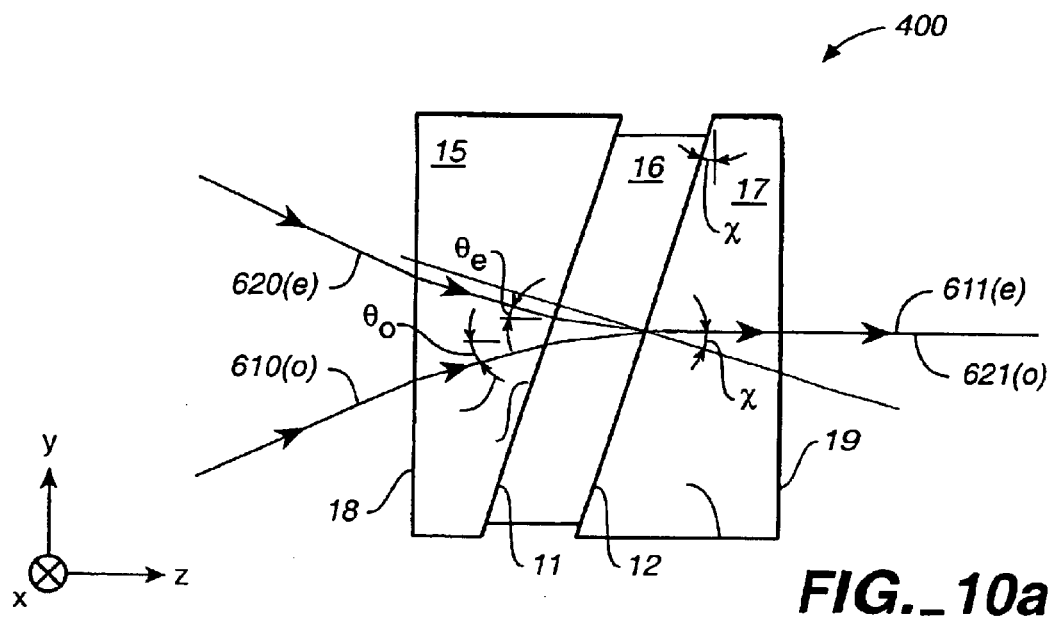
FIG._10a
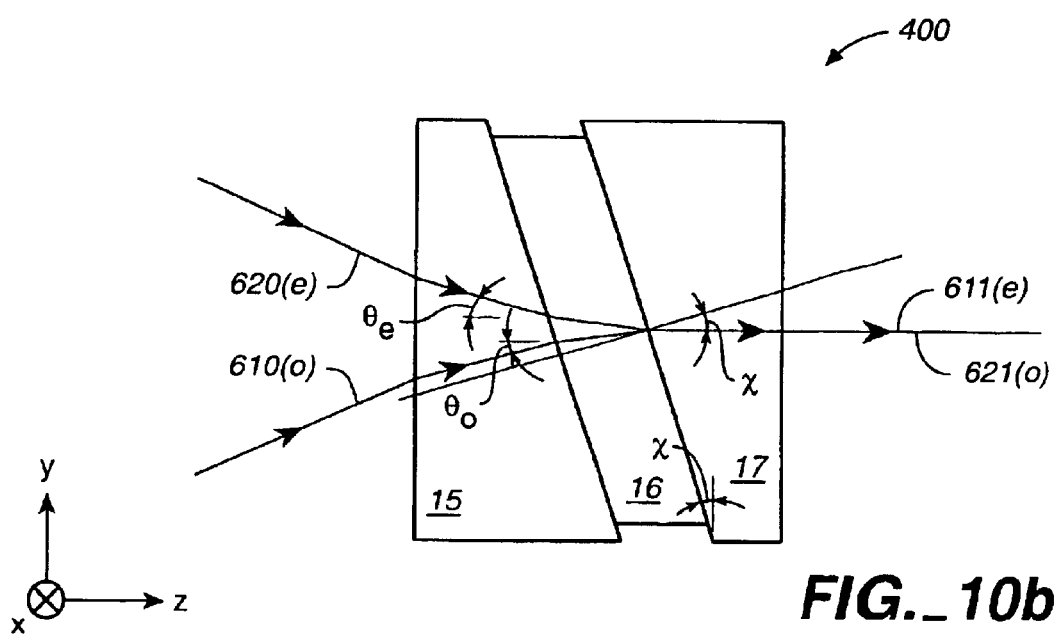
FIG._10b

INTEGRATED TWO-PUMP COMBINER FOR OPTICAL FIBER AMPLIFIERS

The present invention relates generally to optical technology.

BACKGROUND OF THE INVENTION

Optical fiber amplifiers are commonly used in communication systems. Examples of optical fiber amplifiers include Erbium Doped Fiber Amplifiers ("EDFA") and other type of Rare Earth Doped Fiber Amplifiers. These optical fiber amplifiers are usually pumped by light emitter diodes (LEDs) or lasers. FIG. 1a and FIG. 1b each illustrate that an EDFA 100 is optically pumped by two polarized light sources, such as, two polarized lasers.

FIG. 1a illustrates a backward pumping scheme. With the backward pumping scheme, the optical signal to be amplified and the pumping light travel in opposite directions. A first pump light P1 received from pump laser one and a second pump light P2 received from pump laser two are combined by a Polarization Maintenance ("PM") combiner 124. The output from PM combiner 124 is transmitted through an isolator 125 to a Wavelength Divisional Multiplex ("WDM") coupler 126 as combined pumping light. The combined pumping light exits from WDM coupler 126 and enters EDFA 100. An input optical signal Si is optically coupled to EDFA 100 and travels a direction opposite to the traveling direction of the pumping light. Input optical signal Si is amplified in EDFA 100, passes through WDM coupler 126 and an isolator 127, and becomes output light So.

FIG. 1b illustrates a forward pumping scheme. With the forward pumping scheme, the optical signal to be amplified and the pumping light travel in the same direction. A first polarized light P1 received from pump laser one and a second polarized light P2 received from pump laser two are combined by a PM combiner 134. The output from PM combiner 134 is transmitted through an isolator 135 to a WDM coupler 136 as combined pumping light. The combined pumping light exits from WDM coupler 136 and enters EDFA 100. An input optical signal Si, after passing through an isolator 137 and a WDM coupler 136, enters EDFA 100 and travels in the same direction as the traveling direction of the pumping light. Input optical signal Si is amplified in EDFA 100, and becomes output light So.

SUMMARY OF THE INVENTION

In one aspect, the invention provides an integrated optical fiber amplifier system. The integrated optical fiber amplifier system includes a non-reciprocal combination-device and an optical fiber amplifier. The non-reciprocal combination-device has a principal direction. The non-reciprocal combination-device includes a first birefringent wedge, a second birefringent wedge, and a non-reciprocal rotating element. The first birefringent wedge has a first optical axis perpendicular to the principal direction. The second birefringent wedge has a second optical axis perpendicular to the principal direction and the second optical axis forms a first angle with respect to the first optical axis. The non-reciprocal rotating element optically coupled between the first and the second birefringent wedge. The non-reciprocal rotating element is an optical device that rotates the polarization of light passing through the optical device by a second angle. The optical fiber amplifier is optically coupled to the first birefringent wedge for receiving a combined pump light from the non-reciprocal combination-device in the reverse principal direction.

In another aspect, the invention provides an integrated optical fiber amplifier system. The integrated optical fiber amplifier system includes a non-reciprocal combination-device and an optical fiber amplifier. The non-reciprocal combination-device has a principal direction. The non-reciprocal combination-device includes a first birefringent wedge, a second birefringent wedge, and a non-reciprocal rotating element. The optical fiber amplifier is optically coupled to the first birefringent wedge for receiving a combined pump light from the non-reciprocal combination-device in the reverse principal direction. The non-reciprocal combination-device is configured for enabling at least the following functions: (1) light entering the second birefringent wedge as an e-ray in a first input direction exits from the second birefringent wedge as an o-ray in the principal direction; (2) light entering the first birefringent wedge as an o-ray in a second input direction exits from the second birefringent wedge as an e-ray in the principal direction; (3) light entering the second birefringent wedge as an e-ray in a reverse principal direction exits from the first birefringent wedge as an e-ray in the reverse principal direction; and (4) light entering the second birefringent wedge as an o-ray in the reverse principal direction exits from the first birefringent wedge as an o-ray in the reverse principal direction.

In another aspect, the invention provides an integrated two-pump combiner. The integrated two-pump combiner includes a non-reciprocal combination-device and a wavelength division multiplex filter. The non-reciprocal combination-device has a principal direction. The non-reciprocal combination-device includes a first birefringent wedge, a second birefringent wedge, and a non-reciprocal rotating element. The first birefringent wedge has a first optical axis perpendicular to the principal direction. The second birefringent wedge has a second optical axis perpendicular to the principal direction and the second optical axis forms a first angle with respect to the first optical axis. The non-reciprocal rotating element optically coupled between the first and the second birefringent wedge. The non-reciprocal rotating element is an optical device that rotates the polarization of light passing through the optical device by a second angle. The wavelength division multiplex filter is optically coupled to the second birefringent wedge.

In another aspect, the invention provides an integrated two-pump combiner. The integrated two-pump combiner includes a non-reciprocal combination-device and a wavelength division multiplex filter. The non-reciprocal combination-device has a principal direction. The non-reciprocal combination-device includes a first birefringent wedge, a second birefringent wedge, and a non-reciprocal rotating element. The non-reciprocal rotating element is an optical device that rotates the polarization of light passing through the optical device by a second angle. The wavelength division multiplex filter is optically coupled to the second birefringent wedge. The non-reciprocal combination-device is configured for enabling at least the following functions: (1) light entering the second birefringent wedge as an e-ray in a first input direction exits from the second birefringent wedge as an o-ray in the principal direction; (2) light entering the first birefringent wedge as an o-ray in a second input direction exits from the second birefringent wedge as an e-ray in the principal direction; (3) light entering the second birefringent wedge as an e-ray in a reverse principal direction exits from the first birefringent wedge as an e-ray in the reverse principal direction; and (4) light entering the second birefringent wedge as an o-ray in the reverse principal direction exits from the first birefringent wedge as an o-ray in the reverse principal direction.

In another aspect, the invention provides a method of coupling a combined pump light created from a first polarized pump light and a second polarized pump light to an optical fiber amplifier. The method includes the step of providing a non-reciprocal combination-device having a principal direction and a reverse principal direction. The method includes the step of directing the first polarized pump light to enter the non-reciprocal combination-device in a first input direction as an e-ray and to exit from the non-reciprocal combination-device in the principal direction as a first polarized component of the combined pump light. The method includes the step of directing the second polarized pump light to enter the non-reciprocal combination-device in a second input direction as an o-ray and to exit from the non-reciprocal combination-device in the principal direction as a second polarized component of the combined pump light. The method includes the step of directing both the first and second polarized components of the combined pump light to enter the optical fiber amplifier.

In another aspect, the invention provides a method of amplifying an optical input signal using an optical fiber amplifier that has an input end and an output end. The method includes the step of providing a non-reciprocal combination-device having a principal direction and a reverse principal direction. The method includes the step of providing a first polarized pump light and a second polarized pump light for creating a combined pump light. The method includes the step of directing the first polarized pump light to enter the non-reciprocal combination-device in a first input direction as an e-ray and to exit from the non-reciprocal combination-device in the principal direction as a first polarized component of the combined pump light. The method includes the step of directing the second polarized pump light to enter the non-reciprocal combination-device in a second input direction as an o-ray and to exit from the non-reciprocal combination-device in the principal direction as a second polarized component of the combined pump light. The method includes the step of directing both the first and second polarized components of the combined pump light to enter the output end of the optical fiber amplifier. The method includes the step of directing the optical input signal to pass through the optical fiber amplifier from the input end to the output end and to pass through the non-reciprocal combination-device in the reserve principal direction.

In another aspect, the invention provides a method of coupling a combined pump light created from a first polarized pump light and a second polarized pump light to an optical fiber amplifier. The method includes the step of providing a non-reciprocal combination-device having a principal direction and a reverse principal direction. The method includes the step of directing the first polarized pump light to enter the non-reciprocal combination-device in a first input direction as an e-ray and to exit from the non-reciprocal combination-device in the principal direction as a first intermediate pump light. The method includes the step of reflecting the first intermediate pump light to pass through the non-reciprocal combination-device in the reverse principal direction as a first polarized component of the combined pump light. The method includes the step of directing the second polarized pump light to enter the non-reciprocal combination-device in a second input direction as an o-ray and to exit from the non-reciprocal combination-device in the principal direction as a second intermediate pump light. The method includes the step of reflecting the second intermediate pump light to pass through the non-reciprocal combination-device in the reverse principal direction as a second polarized component of the combined pump light. The method includes the step of directing both the first and second polarized components of the combined pump light to enter the optical fiber amplifier. The method can include the step of reflecting the first intermediate pump light with a wavelength division multiplex filter. The method can include the step of reflecting the second intermediate pump light with a wavelength division multiplex filter.

In another aspect, the invention provides a method of amplifying an optical input signal using an optical fiber amplifier that has an input end and an output end. The method includes the step of providing a first polarized pump light and a second polarized pump light for creating a combined pump light. The method includes the step of providing a non-reciprocal combination-device having a principal direction and a reverse principal direction. The method includes the step of directing the first polarized pump light to enter the non-reciprocal combination-device in a first input direction as an e-ray and to exit from the non-reciprocal combination-device in the principal direction as a first intermediate pump light. The method includes the step of reflecting the first intermediate pump light to pass through the non-reciprocal combination-device in the reverse principal direction as a first polarized component of the combined pump light. The method includes the step of directing the second polarized pump light to enter the non-reciprocal combination-device in a second input direction as an o-ray and to exit from the non-reciprocal combination-device in the principal direction as a second intermediate pump light. The method includes the step of reflecting the second intermediate pump light to pass through the non-reciprocal combination-device in the reverse principal direction as a second polarized component of the combined pump light. The method includes the step of directing both the first and second polarized components of the combined pump light to enter the input end of the optical fiber amplifier. The method includes the step of directing the optical input signal to pass through the non-reciprocal combination-device in the reverse principal direction and enter the optical fiber amplifier from the input end.

Aspects of the invention can include one or more of the following advantages. An integrated two-pump combiner using non-reciprocal combination-devices may have small insertion loss, compact size, and reduced manufacturing cost. An Integrated two-pump combiner using a non-reciprocal combination-device may also function as an optical isolator. Other advantages will be readily apparent from the attached figures and the description below.

BRIEF DESCRIPTION OF THE DRAWINGS

FIG. 1a illustrates pump light for pumping a Erbium Doped Fiber Amplifier is created by combing the light from two pump lasers in a backward pumping scheme.

FIG. 1b illustrates pump light for pumping a Erbium Doped Fiber Amplifier is created by combing the light from two pump lasers in a forward pumping scheme.

FIG. 2 illustrates an integrated two-pump combiner 200 for a backward pumping scheme.

FIG. 3 illustrates an integrated two-pump combiner 300 for a forward pumping scheme.

FIG. 4a illustrates an implementation of a non-reciprocal combination-device.

FIG. 4b illustrates a specific configuration of birefringent wedges and a Faraday rotator of FIG. 4a.

FIGS. 4c–4e illustrate alternative configurations of the birefringent wedges and the Faraday rotator of FIG. 4a.

FIG. 5a illustrates the paths traveled by light that enters the non-reciprocal combination-device of FIG. 4a in the principal direction.

FIG. 5b illustrates that light entering the first birefringent wedge as an e-ray in the principal direction exits from the second birefringent wedge as an o-ray in the first output direction.

FIG. 5c illustrates that light entering the first birefringent wedge as an o-ray in the principal direction exits from the second birefringent wedge as an e-ray in the second output direction.

FIG. 6a illustrates the paths traveled by light that enters the non-reciprocal combination-device of FIG. 4a in the first and the second input direction.

FIG. 6b illustrates that light entering the second birefringent wedge as an e-ray in the first input direction exits from the second birefringent wedge as an o-ray in the principal direction.

FIG. 6c illustrates that light entering the first birefringent wedge as an o-ray in the second input direction exits from the second birefringent wedge as an e-ray in the principal direction.

FIG. 7a illustrates the paths traveled by the light that enters the non-reciprocal combination-device of FIG. 4a in the reverse principal direction.

FIG. 7b illustrates that light entering the second birefringent wedge as an e-ray in the reverse principal direction exits from the first birefringent wedge as an e-ray in the reverse principal direction.

FIG. 7c illustrates that light entering the second birefringent wedge as an o-ray in the reverse principal direction exits from the first birefringent wedge as an o-ray in the reverse principal direction.

FIG. 8 illustrates an implementation of integrated two-pump combiner 200 for the backward pumping scheme.

FIG. 9a illustrates an implementation of integrated two-pump combiner 300 for the forward pumping scheme.

FIG. 9b illustrates an alternative implementation of integrated two-pump combiner 300 for the forward pumping scheme.

FIG. 10a illustrates an implementation of non-reciprocal combination-device 400 constructed using birefringent crystal materials with indexes $n_e$ larger than $n_o$.

FIG. 10b illustrates an implementation of non-reciprocal combination-device 400 constructed using birefringent crystal materials with indexes $n_e$ smaller than $n_o$.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals herein may be applied to other embodiments. Thus, the present invention is not intended to be limited to the embodiments shown, but is to be accorded the widest scope consistent with the principals and features described herein.

The present invention will be described in terms of an integrated two-pump combiner having specific components having specific configurations. Similarly, the present invention will be described in terms of components having specific relationships, such as distances or angles between components. However, one of ordinary skill in the art will readily recognize that the devices and systems described can include other components having similar properties, other configurations, and other relationships between components.

FIGS. 2 and 3 illustrate, respectively, an integrated two-pump combiner 200 for a backward pumping scheme and an integrated two-pump combiner 300 for a forward pumping scheme.

As shown in FIG. 2, integrated two-pump combiner 200 includes two ports 280 and 290 for receiving pump light P1 and P2, one port 220 for generating the output optical signal, and one port 210 for coupling the combined pump light Po to EDFA100. Input optical signal Si passing through EDFA100 gets amplified in EDFA100, and passes through integrated two-pump combiner 200 as output optical signal So. Integrated two-pump combiner 200 also functions as an optical isolator such that light cannot travel from port 220 to port 210. The optical isolator properties of the two-pump combiner 200 are described in greater detail below.

As shown in FIG. 3, integrated two-pump combiner 300 includes two ports 380 and 390 for receiving pump light P1 and P2, one port 310 for receiving the input optical signal and one port 320 for coupling the combined pump light Po to EDFA100. Port 320 is also for transmitting to EDFA100 the input optical signal received from port 310. Input optical signal Si passing through integrated two-pump combiner 300 gets amplified in EDFA100, and becomes output optical signal So. Integrated two-pump combiner 300 also functions as an optical isolator such that light cannot travel from port 320 to port 310.

Implementations of instant invention provide integrated two-pump combiners 200 and 300 that use non-reciprocal combination-devices. The configuration and operation of the non-reciprocal combination device is described in greater detail below. The non-reciprocal combination-device generally includes two birefringent wedges and a non-reciprocal rotating element such as a Faraday rotator.

FIGS. 4a and 4b illustrate an implementation of a non-reciprocal combination-device 400 that includes a birefringent wedge 15, a birefringent wedge 17, and a non-reciprocal rotating element such as Faraday rotator 16. Birefringent wedges 15 and 17 are in the form of tapered plates. Surface 11 of birefringent wedge 15 faces surface 12 of birefringent wedge 17. In one implementation of non-reciprocal combination-device 400, surface 11 of birefringent wedge 15 substantially parallels surface 12 of birefringent wedge 17.

A coordinate system is illustrated including the x-direction, the y-direction and the z-direction. The optical axis of birefringent wedge 15 is in the x-direction. The optical axis of birefringent wedge 17 is in the x-y direction. Faraday rotator 16 is designed in such a way that, when light passes through the Faraday rotator 16 either in the positive or the negative z-direction, the polarization of the light will be rotated substantially 45 degrees with respect to the positive z-axis. Non-reciprocal combination-device 400 has a principal direction that is in the positive z-direction, and a reverse principal direction that is in the negative z-direction. Non-reciprocal combination-device 400 also has a first input direction that is in the z−αy direction, a second input direction that is in the z+βy direction, a first output direction that is in the z+γy direction, and a second output direction that is in the z−δy direction. Where α, β, γ and δ are positive numbers.

In general, non-reciprocal combination-device 400, including a first and a second birefringent wedge, is constructed to perform one or more of the following six functions:

(1) light entering the first birefringent wedge as an e-ray in the principal direction exits from the second birefringent wedge as an o-ray in the first output direction;

(2) light entering the first birefringent wedge as an o-ray in the principal direction exits from the second birefringent wedge as an e-ray in the second output direction;

(3) light entering the second birefringent wedge as an e-ray in the first input direction exits from the second birefringent wedge as an o-ray in the principal direction;

(4) light entering the first birefringent wedge as an o-ray in the second input direction exits from the second birefringent wedge as an e-ray in the principal direction;

(5) light entering the second birefringent wedge as an e-ray in the reverse principal direction exits from the first birefringent wedge as an e-ray in the reverse principal direction; and (6) light entering the second birefringent wedge as an o-ray in the reverse principal direction exits from the first birefringent wedge as an o-ray in the reverse principal direction.

FIGS. 5a and 5b illustrate the first function in detail. FIGS. 5a and 5c illustrate the second function in detail. FIGS. 6a and 6b illustrate the third function in detail. FIGS. 6a and 6c illustrate the fourth function in detail. FIGS. 7a and 7b illustrate the fifth function in detail. FIGS. 7a and 7c illustrate the sixth function in detail.

As shown in FIGS. 5a and 5b, light 520(e) traveling in the principal direction (i.e., the positive z-direction) enters birefringent wedge 15 as an e-ray with the x polarization. Light 520(e) is refracted at surface 11. After passing through Faraday rotator 16, the polarization of light 520(e) is rotated substantially positive 45 degrees with respect to the positive z-axis, and light 520(e) becomes light 521(o) with the x+y polarization. Light 521(o) is refracted again at surface 12 and enters birefringent wedge 17 as an o-ray. Light 521(o) exits from birefringent wedge 17, traveling generally in the first output direction (i.e., the z+yγ direction).

As shown in FIGS. 6a and 6b, light 620(e) traveling in the first input direction (i.e., the positive z-direction) enters birefringent wedge 15 as an o-ray with the y polarization. Light 510(o) is refracted at surface 11. After passing through Faraday rotator 16, the polarization of light 510(o) is rotated substantially positive 45 degrees with respect to the positive z-axis, and light 510(o) becomes light 511(e) with the x-y polarization. Light 511(e) is refracted again at surface 12 and enters birefringent wedge 17 as an e-ray. Light 511(e) exits from birefringent wedge 17 traveling generally in the second output direction (i.e., the z-δ y direction).

As shown in FIGS. 6a and 6b, light 620(e) traveling in the first input direction (i.e., the z-α y direction) enters birefringent wedge 15 as an e-ray with the x polarization. Light 620(e) is refracted at surface 11. After passing through Faraday rotator 16, the polarization of light 620(e) is rotated substantially positive 45 degrees with respect to the positive z-axis, and light 620(e) becomes light 621(o) with the x+y polarization. Light 621(o) is refracted again at surface 12 and enters birefringent wedge 17 as an o-ray. Light 621(o) exits from birefringent wedge 17 traveling in the principal direction (i.e., the positive z-direction).

As shown in FIGS. 6a and 6c, light 610(o) traveling in the second input direction (i.e., the z+β y direction) enters birefringent wedge 15 as an o-ray with the y polarization. Light 610(o) is refracted at surface 11. After passing through Faraday rotator 16, the polarization of light 610(o) is rotated substantially positive 45 degrees with respect to the positive z-axis, and light 610(o) becomes light 611(e) with the x-y polarization. Light 611(e) is refracted again at surface 12 and enters birefringent wedge 17 as an e-ray. Light 611(e) exits from birefringent wedge 17 traveling in the principal direction (i.e., the positive z-direction).

As shown in FIGS. 7a and 7b, light 720(e) traveling in the reverse principal direction (i.e., the negative z-direction) enters birefringent wedge 17 as an e-ray with the x-y polarization. Light 720(e) is refracted at surface 12. After passing through Faraday rotator 16, the polarization of light 720(e) is rotated substantially positive 45 degrees with respect to the positive z-axis, and light 720(e) becomes light 721(e) with the x polarization. Light 721(e) is refracted again at surface 11 and enters birefringent wedge 15 as an e-ray. Light 721(e) exits from birefringent wedge 15 traveling in the reverse principal direction (i.e., the negative z-direction).

As shown in FIGS. 7a and 7c, light 710(o) traveling in the reverse principal direction (i.e., the negative z-direction) enters birefringent wedge 17 as an o-ray with the x+y polarization. Light 710(o) is refracted at surface 12. After passing through Faraday rotator 16, the polarization of light 710(o) is rotated substantially positive 45 degrees with respect to the positive z-axis, and light 710(o) becomes light 711(o) with the y polarization. Light 710(o) is refracted again at surface 11 and enters birefringent wedge 15 as an o-ray. Light 711(o) exits from birefringent wedge 15 traveling in the reverse principal direction (i.e., the negative z-direction).

Due to the differences in the refractive index between the o-ray and the e-ray, light 721(e) and 711(o) can exit from birefringent wedge 15 with different paths. However, when the paths of 721(e) and 711(o) are substantially parallel, light 721(e) and 711(o) can be coupled to a single fiber using a collimator.

In implementation of non-reciprocal combination-device 400 shown in FIG. 4b, the optical axes of birefringent wedges 15 and 17 are, respectively, in the x direction and the x-y direction. Faraday rotator 16 is designed in such a way that the polarization of light passing through the Faraday rotator 16 will be rotated a positive 45 degrees with respect to the positive z-axis.

In another implementation of non-reciprocal combination-device 400, as shown FIG. 4c, the optical axes of birefringent wedges 15 and 17 are, respectively, in the x direction and the x+y direction. Faraday rotator 16 is designed in such a way that the polarization of light passing through the Faraday rotator 16 will be rotated substantially negative 45 degrees with respect to the positive z-axis.

In a third implementation of non-reciprocal combination-device 400, as shown in FIG. 4d, the optical axes of birefringent wedges 15 and 17 are, respectively, in the y direction and the x+y direction. Faraday rotator 16 is designed in such a way that the polarization of light passing through the Faraday rotator 16 will be rotated substantially positive 45 degrees with respect to the positive z-axis.

In a fourth implementation of non-reciprocal combination-device 400, as shown in FIG. 4e, the optical axes of birefringent wedges 15 and 17 are, respectively, in the cos(Φ)x+sin(Φ)y direction and the cos(Φ-45)x+sin(Φ-45) y direction. Faraday rotator 16 is designed in such a way that the polarization of light passing through the Faraday rotator 16 will be rotated substantially positive 45 degrees with respect to the positive z-axis.

In the implementation of non-reciprocal combination-device 400 of FIG. 4a, birefringent wedges 15 and 17 are essentially in contact with Faraday rotator 16. In other implementations, other optical media (including air) can be inserted between birefringent wedge 15 and Faraday rotator 16, and between birefringent wedge 17 and Faraday rotator 16.

FIG. 8 illustrates an implementation of integrated two-pump combiner 200 for the backward pumping scheme. Integrated two-pump combiner 200 includes a non-reciprocal combination-device 400, and lenses 840 and 850. A single mode fiber 820 and PM fibers 880 and 890 are optically coupled to lens 840. The positions of single mode fiber 820 and PM fibers 880 and 890 can be fixed with a capillary 830. A single mode fiber 810 is optically coupled to lens 850. The position of single mode fiber 810 can be fixed with a capillary 860.

FIG. 8 illustrates that pump laser one and pump laser two provide polarized pump light P1 and P2 respectively to ports 280 and 290 of integrated two-pump combiner 200, and combined pump light Po exit from port 210. More specifically, polarized pump light P1 exiting from PM fiber 880 is coupled to non-reciprocal combination-device 400 through lens 840, and enters non-reciprocal combination-device 400 in the first input direction (i.e., the z-αy direction) as e-ray 620(*e*). After passing through non-reciprocal combination-device 400, e-ray 620(*e*) become o-ray 621(*o*) traveling in the principal direction (i.e., the positive z-direction). O-ray 321(*o*) is coupled to single mode fiber 810 through lens 850, and becomes a first polarized component of combined pump light Po.

Polarized pump light P2 exiting from PM fiber 890 is coupled to non-reciprocal combination-device 400 through lens 840, and enters non-reciprocal combination-device 400 in the second input direction (i.e., the z+βy direction) as o-ray 610(*o*). After passing through non-reciprocal combination-device 400, o-ray 610(*o*) becomes e-ray 611(*e*) traveling in the principal direction (i.e., the positive z-direction). E-ray 611(*e*) is coupled to single mode fiber 810 through lens 850, and becomes a second polarized component of combined pump light Po.

The first and second polarized components of combined pump light Po are both transmitted into EDFA100. Combined pump light Po in EDFA100 enables input optical signal Si to be amplified in EDFA100.

FIG. 8 also illustrates that input optical signal Si enters port 210 of integrated two-pump combiner 200 and exits from port 220 of integrated two-pump combiner 200. In more detail, input optical signal Si, after being amplified in EDFA100, enters port 210 of integrated two-pump combiner 200 through single mode fiber 810. Input optical signal Si exiting from single mode fiber 810, passes thorough lens 850, and enters non-reciprocal combination-device 400 in the reverse principal direction (i.e., the negative z-direction). Some light of input optical signal Si enters non-reciprocal combination-device 400 as e-ray 720(*e*), while some other light of input optical signal Si enters non-reciprocal combination-device 400 as o-ray 710(*o*). Light 720(*e*) passes through non-reciprocal combination-device 400 as light 721(*e*). Light 721(*e*) passes through lens 840, and enters single mode fiber 820 as a first polarized component of output optical signal So. Light 710(*o*) passes through non-reciprocal combination-device 400 as light 711(*o*). Light 711(*o*) passes through lens 840, and enters single mode fiber 820 as a second polarized component of output optical signal So. The first and second polarized components of output optical signal So are combined in single mode fiber 820.

FIG. 9*a* illustrates an implementation of integrated two-pump combiner 300 for the forward pumping scheme. Integrated two-pump combiner 300 includes a non-reciprocal combination-device 400, WDM filter 900, and lenses 840 and 850. A single mode fiber 820 and PM fibers 880 and 890 are optically coupled to lens 840. The positions of single mode fiber 820 and PM fibers 880 and 890 can be fixed with a capillary 830. A single mode fiber 810 is optically coupled to lens 850. The position of single mode fiber 810 can be fixed with a capillary 860.

WDM filter 900 is designed in such a way to perform the following functions: (1) when pump light exiting from non-reciprocal combination-device 400 is incident upon WDM filter 900, the pump light will be reflected back into non-reciprocal combination-device 400; (2) when optical light signal exiting from lens 850 is incident upon WDM filter 900, the optical light signal will pass through WDM filter 900 and enter non-reciprocal combination-device 400.

In one implementation, WDM filter 900 reflects light that has the wavelength of the pump light and transmits light that has the wavelength of the optical signal. For an Erbium Doped Fiber Amplifier, the optical signal can have a wavelength of 1550 nm, and the pump light can have a wavelength of 980 nm. The pump light can also have a wavelength of 1480 nm or a few other wavelengths. WDM filter 900 can be designed to transmit a light optical signal at 1550 nm and reflect pump light at 980 nm or 1480 nm. WDM filter 900 can also be designed to reflect pump light at both 980 nm and 1480 nm.

FIG. 9*a* illustrates that polarized pump light P1 and P2 enters respectively ports 380 and 390 of integrated two-pump combiner 300, and exits from port 320 as combined pump light Po. More specifically, polarized pump light P1 exiting from PM fiber 880 is coupled to non-reciprocal combination-device 400 through lens 840, and enters non-reciprocal combination-device 400 in the first input direction (i.e., the z-αy direction) as e-ray 620(*e*). After passing through non-reciprocal combination-device 400, e-ray 620(*e*) becomes o-ray 621(*o*) traveling in the principal direction (i.e., the positive z-direction). O-ray 621(*o*), after being reflected by WDM filter 900, passes through non-reciprocal combination-device 400 in the reverse principal direction (i.e., the negative z-direction), and enters single mode fiber 820 through lens 840 as a first polarized component of combined pump light Po.

Polarized pump light P2 exiting from PM fiber 890 is coupled to non-reciprocal combination-device 400 through lens 840, and enters non-reciprocal combination-device 400 in the second input direction (i.e., the z+βy direction) as o-ray 610(*o*). After passing through non-reciprocal combination-device 400, o-ray 610(*o*) becomes e-ray 611(*e*) in the principal direction (i.e., the positive z-direction). E-ray 611(*e*), after being reflected by WDM filter 900, passes through non-reciprocal combination-device 400 in the reverse principal direction, and enters single mode fiber 820 through lens 840 as a second polarized component of combined pump light Po.

The first and second polarized components of combined pump light Po are both transmitted into EDFA100. Combined pump light Po in EDFA100 enables input optical signal Si to be amplified in EDFA100.

FIG. 9*a* also illustrates that input optical signal Si enters port 310 of integrated two-pump combiner 300 and exits from port 320 of integrated two-pump combiner 300. More specifically, input optical signal Si, enters port 310 of integrated two-pump combiner 300 through single mode fiber 810. Input optical signal Si exiting from single mode fiber 810, passes thorough both lens 850 and WDM filter 900, and enters non-reciprocal combination-device 400 in the reverse principal direction (i.e., the negative z-direction). Some light of input optical signal Si enters non-reciprocal combination-device 400 as e-ray 720(e), while some other light of input optical signal Si enters non-reciprocal combination-device 400 as o-ray 710(o). Light 720(e) passes through non-reciprocal combination-device 400 as light 721(e). Light 721(e) passes through lens 840, and enters single mode fiber 820 as a first polarized component of output optical signal So. Light 710(o) passes through non-reciprocal combination-device 400 as light 711(o). Light 711(o) passes through lens 840, and enters single mode fiber 820 as a second polarized component of output optical signal So. The first and second polarized components of output optical signal So are combined in single mode fiber 820. Output optical signal So is then amplified by EDFA100.

FIG. 9b illustrates an alternative implementation of integrated two-pump combiner 300 for the forward pumping scheme. Integrated two-pump combiner 300 of FIG. 9b includes a tap filter 950 disposed between lens 850 and WDM filter 900. Using tap filter 950, a small portion of input signal Si can be optically coupled to a monitoring single mode optical fiber 910. In some other implementations, the surface 851 of lens 850 can be coated with reflective material and provide a reflected signal to monitor single mode optical fiber 910.

In general, birefringent wedge 15 and birefringent wedge 17 can be constructed from birefringent crystal materials, such as, calcite, rutile, lithium niobate or yttrium orthvanadate.

A birefringent crystal material in general has refractive indexes $n_e$ for e-ray and $n_o$ for o-ray. Non-reciprocal combination-device 400 can be constructed using birefringent crystal materials with indexes $n_e$ larger than $n_o$, or birefringent crystal materials with indexes ne smaller than $n_o$.

FIGS. 10a and 10b illustrate implementations of non-reciprocal combination-device 400 including birefringent wedges 15 and 17 in the form of tapered plate. Surface 11 of birefringent wedge 15 substantially parallels surface 12 of birefringent wedge 17. The tapering angle of birefringent wedges 15 and 17 is $\chi$.

FIG. 10a illustrates an implementation of non-reciprocal combination-device 400 constructed using birefringent crystal materials with indexes $n_e$ larger than $n_o$ FIG. 10a also illustrates the paths traveled by e-ray 620(e) and o-ray 610(o). E-ray 620(e) is incident upon surface 11 of birefringent wedge 15 in the $\cos(\theta_e)$ z–$\sin(\theta_e)$ y direction and exits from birefringent wedge 17 in the positive z-direction. Here $\theta_e$ satisfies equation $n_e \sin(\chi-\theta_e)=n_o \sin(\chi)$. O-ray 610(o) is incident upon surface 11 of birefringent wedge 15 in the $\cos(\theta_o)$ z+$\sin(\theta_o)$ y direction and exits from birefringent wedge 17 in the positive z-direction. Here $\theta_o$ satisfies equation $n_o \sin(\chi+\theta_o)=n_e \sin(\chi)$.

FIG. 10b illustrates an implementation of non-reciprocal combination-device 400 constructed using birefringent crystal materials with indexes $n_e$ smaller than $n_o$ FIG. 10b also illustrates the paths traveled by e-ray 620(e) and o-ray 610(o). E-ray 620(e) is incident upon surface 11 of birefringent wedge 15 in the $\cos(\theta_e)$ z–$\sin(\theta_e)$ y direction and exits from birefringent wedge 17 in the positive z-direction. Here $\theta_e$ satisfies equation $n_e \sin(\chi+\theta_e)=n_o \sin(\chi)$. O-ray 610(o) is incident upon surface 11 of birefringent wedge 15 in the $\cos(\theta_o)$ z+$\sin(\theta_o)$ y direction and exits from birefringent wedge 17 in the positive z-direction. Here $\theta_o$ satisfies equation $n_o \sin(\chi-\theta_o)=n_e \sin(\chi)$.

A method and system has been disclosed for providing integrated two-pump combiners. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An integrated optical fiber amplifier system comprising:

a non-reciprocal combination-device having a principal direction and a reverse principal direction including
a first birefringent wedge having a first optical axis perpendicular to the principal direction, adapted to receive light from at least two pump light sources,
a second birefringent wedge having a second optical axis perpendicular to the principal direction, the second optical axis forming a first angle with respect to the first optical axis, adapted to deliver a combined pump light in the principal direction, and
a non-reciprocal rotating element optically coupled between the first and the second birefringent wedge and adapted to rotate a polarization of light passing therethrough by a second angle; and an optical fiber amplifier optically coupled to the first birefringent wedge for receiving a combined pump light from the non-reciprocal combination-device in the reverse principal direction,
the first birefringent wedge, the second birefringent wedge and the non-reciprocal rotating element being adapted to receive a signal light supplied to the second birefringent wedge in a reverse principal direction and deliver the signal light in a reverse principal direction to an optical fiber.

2. The integrated optical fiber amplifier system of claim 1 further comprising
a first lens optically coupled between the optical fiber amplifier and the first birefringent wedge; and
a second lens optically coupled to the second birefringent wedge.

3. The integrated optical fiber amplifier system of claim 2 wherein the first lens configurable for coupling to a first, a second, and a third optical fibers, and the second lens configurable for coupling to a fourth optical fiber.

4. The integrated optical fiber amplifier system of claim 3 further comprising a capillary for holding the first, the second, and the third optical fibers proximate to the first lens.

5. The integrated optical fiber amplifier system of claim 3 further comprising a capillary for holding the fourth optical fiber proximate to the second lens.

6. The integrated optical fiber amplifier system of claim 3 wherein the, first lens is adapted to direct
light received from the first optical fiber to enter the non-reciprocal combination-device in a first input direction with a first polarization,
light received from the second optical fiber to enter the non-reciprocal combination-device in a second input direction with a second polarization, and
light received from the non-reciprocal combination-device in the reverse principal direction to enter the third optical fiber.

7. The integrated optical fiber amplifier system of claim 3 wherein the second lens if adapted to direct
light received from the non-reciprocal combination-device in the principal direction to enter the fourth optical fiber, and light received from the fourth optical fiber to enter the non-reciprocal combination-device in the reverse principal direction.

8. The integrated optical fiber amplifier system of claim 1 wherein the first angle is substantially 45 degrees and the second angle is substantially 45 degrees.

9. The integrated optical fiber amplifier system of claim 1 wherein the non-reciprocal rotating element is a Faraday rotator.

10. An integrated two-pump combiner comprising:
a non-reciprocal combination-device having a principal direction and a reverse principal direction including a first birefringent wedge adapted to receive light from at least two pump light sources, a second birefringent wedge, adapted to deliver a combined pump light in the principal direction and a non-reciprocal rotating element, the non-reciprocal combination-device configured at least for enabling
light entering the second birefringent wedge as an e-ray in a first input direction to exit from the second birefringent wedge as an o-ray in the principal direction,
light entering the first birefringent wedge as an o-ray in a second input direction to exit from the second birefringent wedge as an e-ray in the principal direction,
light entering the second birefringent wedge as an e-ray in the reverse principal direction to exit from the first birefringent wedge as an e-ray in the reverse principal direction, and
light entering the second birefringent wedge as an o-ray in the reverse principal direction to exit from the first birefringent wedge as an o-ray in the reverse principal direction; and
an optical fiber amplifier optically coupled to the first birefringent wedge for receiving a combined pump light from the non-reciprocal combination-device in the reverse principal direction.

11. The integrated optical fiber amplifier system of claim 10 further comprising:
a first lens optically coupled between the optical fiber amplifier and the first birefringent wedge; and
a second lens optically coupled to the second birefringent wedge.

12. The integrated optical fiber amplifier system of claim 11 wherein the first lens configurable for coupling to a first, a second, and a third optical fibers, and the second lens configurable for coupling to a fourth optical fiber.

13. The integrated optical fiber amplifier system of claim 12 further comprising a capillary for bolding the first, the second, and the third optical fibers proximate to the first lens.

14. The integrated fiber amplifier system of claim 12 further comprising a capillary for holding the fourth optical fiber proximate to the second lens.

15. The integrated optical fiber amplifier system of claim 12 wherein the first lens is adapted to direct
light received from the first optical fiber to enter the non-reciprocal combination-device in a first input direction with a first polarization,
light received from the second optical fiber to enter the non-reciprocal combination-device in a second input direction with a second polarization, and
light received from the non-reciprocal combination-device in the reverse principal direction to enter the third optical fiber.

16. The integrated optical fiber amplifier system of claim 12 wherein the second lens is adapted to direct light received from the non-reciprocal combination-device in the principal direction to enter the fourth fiber, and
light received from the fourth optical fiber to enter the non-reciprocal combination-device in the reverse principal direction.

17. The integrated optical fiber amplifier system of claim 10 wherein the first angle is substantially 45 degrees and the second angle is substantially 45 degrees.

18. The integrated optical fiber amplifier system of claim 10 wherein the non-reciprocal rotating element is a Faraday rotator.

19. An integrated two-pump combiner comprising:
a non-reciprocal combination-device having a principal direction and a reverse principal direction including a first birefringent wedge adapted to receive light from at least two pump light sources, a second birefringent wedge adapted to deliver a combined pump light in the principal direction, and a non-reciprocal rotating element, the non-reciprocal combination-device configured at least for enabling
light entering the second birefringent wedge as an e-ray in a first input direction to exit from the second birefringent wedge as an o-ray in the principal direction,
light entering the first birefringent wedge as an o-ray in a second input direction to exit from the second birefringent wedge as an e-ray in the principal direction,
light entering the second birefringent wedge as an e-ray in the reverse principal direction to exit from the first birefringent wedge as an e-ray in the reverse principal direction, and
light entering the second birefringent wedge as an o-ray in the reverse principal direction to exit from the first birefringent wedge as an o-ray in the reverse principal direction; and
a wavelength division multiplex filter optically coupled to the second birefringent wedge.

20. The integrated two-pump combiner of claim 19 further comprising a first lens optically coupled to the first birefringent wedge; and a second lens optically coupled to the wavelength division multiplex filter.

21. The integrated two-pump combiner of claim 20 wherein the first lens configurable for coupling to a first, a second, and a third optical fibers, and the second lens configurable for coupling to a fourth optical fiber.

22. The integrated two-pump combiner of claim 21 further comprising a capillary for holding the first, the second, and the third optical fibers proximate to the first lens.

23. The integrated two-pump combiner of claim 21 further comprising a capillary for holding the fourth optical fiber proximate to the second lens.

24. The integrated two-pump combiner of claim 21 wherein the first lens is adapted to
direct light received from the first optical fiber to enter the non-reciprocal combination-device in a first input direction with a first polarization,
light received from the second optical fiber to enter the non-reciprocal combination-device in a second input direction with a second polarization, and
light received from the non-reciprocal combination-device in the reverse principal direction to enter the third optical fiber.

25. The integrated two-pump combiner of claim 21 wherein the second lens is adapted to direct light received from the non-reciprocal combination-device in the principal direction to enter the fourth optical fiber, and light received from the fourth optical fiber to enter the non-reciprocal combination-device in the reverse principal direction.

26. The integrated two-pump combiner of claim 19 wherein the first angle is substantially 45 degrees and the second angel is substantially 45 degrees.

27. The integrated two-pump combiner of claim 19 wherein the non-reciprocal rotating element is a Faraday rotator.

28. The integrated two-pump combiner of claim 20 further comprising a tap filter optically coupled between the wavelength division multiplex filter and the second lens.

29. The integrated two-pump combiner of claim 20 wherein the second lens has a surface coated with reflective materials.

30. A method of coupling a combined pump light created from a first polarized pump light and a second polarized pump light to an optical fiber amplifier, the method comprising:

providing a non-reciprocal combination-device having a principal direction and a reverse principal direction;

directing the first polarized pump light to enter the non-reciprocal combination-device in a first input direction as an e-ray and to exit from the non-reciprocal combination-device in the principal direction as a first polarized component of the combined pump light;

directing the second polarized pump light to enter the non-reciprocal combination-device in a second input direction as an o-ray and to exit from the non-reciprocal combination-device in the principal direction as a second polarized component of the combined pump light;

directing both the first and second polarized components of the combined pump light to enter the optical fiber amplifier;

directing a signal light to enter the non-reciprocal combination device in the reverse principal direction;

directing the signal light to exit the non-reciprocal combination device in the reverse principal direction; and directing the signal light exiting the non-reciprocal combination device in the reverse principal direction to enter an optical fiber.

31. A method of amplifying an optical input signal using an optical fiber amplifier that has an input end and an output end, the method comprising:

providing a non-reciprocal combination-device having a principal direction and a reverse principal direction;

providing a first polarized pump light and a second polarized pump light for creating a combined pump light;

directing the first polarized pump light to enter the non-reciprocal combination-device in a first input directions as an e-ray and to exit from the non-reciprocal combination-device in the principal direction as a first polarized component of the combined pump light;

directing the second polarized pump light to enter the non-reciprocal combination-device in a second input direction as an o-ray and to exit from the non-reciprocal combination-device in the principal direction as a second polarized component of the combined pump light;

directing both the first and second polarized components of the combined pump light to enter the output end of the optical fiber amplifier; and directing the optical input signal to pass through the optical fiber amplifier from the input end to the output end and to pass through the non-reciprocal combination-device in the reverse principal direction.

32. A method of coupling a combined pump light created from a first polarized pump light and a second polarized pump light to an optical fiber amplifier, the method comprising:

providing a non-reciprocal combination-device having a principal direction and a reverse principal direction;

directing the first polarized light to enter the non-reciprocal combination-device in a first input direction as an e-ray and to exit from the non-reciprocal combination-device in the principal direction as a first intermediate pump light;

reflecting the first intermediate pump light to pass through the non-reciprocal combination-device in the reverse principal direction as a first polarized component of the combined pump light;

directing the second polarized pump light to enter the non-reciprocal combination-device in a second input direction as an o-ray and to exit from the non-reciprocal combination-device in the principal direction as a second intermediate pump light;

reflecting the second intermediate pump light to pass through the non-reciprocal combination-device in the reverse principal direction as a second polarized component of the combined pump light; and directing both the first and second polarized components of the combined pump light to enter the optical fiber amplifier.

33. The method of claim 32 wherein the step of reflecting the first intermediate pump light includes reflecting the first intermediate pump light with a wavelength division multiplex filter.

34. The method of claim 32 wherein the step of reflecting the second intermediate pump light includes reflecting the second intermediate pump light with a wavelength division multiplex filter.

35. A method of amplifying an optical input signal using an optical fiber amplifier that has an input end and an output end, the method comprising:

providing a first polarized pump light and a second polarized pump light for creating a combined pump light;

providing a non-reciprocal combination-device having a principal direction and a reverse principal direction;

directing the first polarized pump light to enter the non-reciprocal combination-device in a first input direction as an e-ray and to exit from the non-reciprocal combination-device in the principal direction as a first intermediate pump light;

reflecting the first intermediate pump light to pass through the non-reciprocal combination-device in the reverse principal direction as a first polarized component of the combined pump light;

directing the second polarized pump light to enter the non-reciprocal combination-device in a second input direction as an o-ray and to exit from the non-reciprocal combination-device in the principal direction as a second intermediate pump light;

reflecting the second intermediate pump light to pass through the non-reciprocal combination-device in the reverse principal directions as a second polarized component of the combined pump light;

directing both the first and second polarized components of the combined pump light to enter the input end of the optical fiber amplifier; and directing the optical input signal to pass through the non-reciprocal combination-device in the reverse principal direction and enter the optical fiber amplifier from the input end.

36. The method of claim 35 wherein the step of reflecting the first intermediate pump light includes reflecting the first intermediate pump light with a wavelength division multiplex filter.

37. The method of claim 35 wherein the step of reflecting the second intermediate pump light includes reflecting the second intermediate pump light with a wavelength division multiplex filter.

38. The method of claim 35 wherein the steps of directing the optical input signal includes directing the optical input signal to pass sequentially through a wavelength division multiplex filter and the non-reciprocal combination-device in the reverse principal direction.

39. An integrated optical fiber amplifier system comprising:

a non-reciprocal combination-device having a principal direction and a reverse principal direction including
a first birefringent wedge having a first optical axis perpendicular to the principal direction, adapted to receive light from at least two pump light sources,
a second birefringent wedge having a second optical axis perpendicular to the principal direction, the second optical axis forming a first angle with respect to the first optical axis, adapted to deliver a combined pump light in the principal direction, and
a non-reciprocal rotating element optically coupled between the first and the second birefringent wedge and adapted to rotate a polarization of light passing therethrough by a second angle; and an optical fiber amplifier optically coupled to the first birefringent wedge for receiving a combined pump light from the non-reciprocal combination-device in the reverse principal direction, a first lens optically coupled between the optical fiber amplifier and the first birefringent wedge; and a second lens optically coupled to the second birefringent wedge, wherein the first lens configurable for coupling to a first, a second, and a third optical fibers, and the second lens configurable for coupling to a fourth optical fiber.

40. The integrated optical fiber amplifier system of claim 39 further comprising a capillary for holding the first, the second, and the third optical fibers proximate to the first lens.

41. The integrated optical fiber amplifier system of claim 39 further comprising a capillary for holding the fourth optical fiber proximate to the second lens.

42. The integrated optical fiber amplifier system of claim 39 wherein the first lens is adapted to direct
light received from the first optical fiber to enter the non-reciprocal combination-device in a first input direction with a first polarization,
light received from the second optical fiber to enter the non-reciprocal combination-device in a second input direction with a second polarization, and
light received from the non-reciprocal combination-device in the reverse principal direction to enter the third optical fiber.

43. The integrated optical fiber amplifier system of claim 39 wherein the second lens is adapted to direct
light received from the non-reciprocal combination-device in the principal direction to enter the fourth optical fiber, and
light received from the fourth optical fiber to enter the non-reciprocal combination-device in the reverse principal direction.

44. An integrated two-pump combiner comprising:

a non-reciprocal combination-device having a principal direction and a reverse principal direction including
a first birefringent having a first optical axis perpendicular to the principal direction,
a second birefringent wedge having a second optical axis perpendicular to the principal direction, the second optical axis forming a first angle with respect to the first optical axis, and
a non-reciprocal rotating element optically coupled between the first and the second birefringent wedge and adapted to rotate a polarization of light passing therethrough by a second angle;

a wavelength division multiplex filter optically coupled to the second birefringent wedge;

at least two sources of pump light coupled to the non-reciprocal combination device;

a first lens optically coupled to the first birefringent wedge; and a second lens optically coupled to the wavelength division multiplex filter, wherein the first lens configurable for coupling to a first, a second, and a third optical fibers, and the second lens configurable for coupling to a fourth optical fiber.

45. The integrated two-pump combiner of claim 44 further comprising a capillary for holding the first, the second, and the third optical fibers proximate to the first lens.

46. The integrated two-pump combiner of claim 44 further comprising a capillary for holding the fourth optical fiber proximate to the second lens.

47. The integrated two-pump combiner of claim 44 wherein the first lens is adapted to direct light received from the first optical fiber to enter the non-reciprocal combination-device in a first input direction with a first polarization, light received from the second optical fiber to enter the non-reciprocal combination-device in a second input direction with a second polarization, and light received from the non-reciprocal combination-device in the reverse principal direction to enter the third optical fiber.

48. The integrated two-pump combiner of claim 44 wherein the second lens if adapted to direct
light received from the non-reciprocal combination-device in the principal direction to enter the fourth optical fiber, and
light received from the fourth optical fiber to enter the non-reciprocal combination-device in the reverse principal direction.

49. An integrated two-pump comprising:

a non-reciprocal combination-device having a principal direction and a reverse principal direction including
a first birefringent wedge having a first optical axis perpendicular to the principal direction,
a second birefringent wedge having a second optical axis perpendicular to the principal direction, the second optical axis forming a first angle with respect to the first optical axis, and
a non-reciprocal rotating element optically coupled between the first and the second birefringent wedge and adapted to rotate a polarization of light passing therethrough by a second angle;

a wavelength division multiplex filter optically coupled to the second birefringent wedge;

at least two sources of pump light coupled to the non-reciprocal combination device;

a first lens optically coupled to the first birefringent wedge; and a second lens optically coupled to the wavelength division multiplex filter; and a tap filter optically coupled between the wavelength division multiplex filter and the second lens.

50. The integrated two-pump combiner of claim 49 wherein the second lens has a surface coated with a reflective material.

* * * * *

UNITED STATES PATENT AND TRADEMARK OFFICE
CERTIFICATE OF CORRECTION

| | | |
|---|---|---|
| PATENT NO. | : 6,900,933 B1 | |
| APPLICATION NO. | : 10/131561 | |
| DATED | : May 31, 2005 | |
| INVENTOR(S) | : Wei-Zhong Li and Qingdong Guo | |

It is certified that error appears in the above-identified patent and that said Letters Patent is hereby corrected as shown below:

Column 7, line 42; replace:
"As shown in FIGS. 6*a* and 6*b*, light 620(*e*) traveling in the first input" with
--As shown in FIGS. 5*a* and 5*c*, light 510(*o*) traveling in the principal--

Column 11, line 34; replace:
"materials with indexes ne" with --materials with indexes $n_e$--

Column 13, line 50, in Claim 13; replace:
"a capillary for bolding" with --a capillary for holding--

Column 13, line 52, in Claim 14; replace:
"14. The integrated fiber amplifier system" with
--14. The integrated optical fiber amplifier system--

Column 14, line 2, in Claim 16; replace:
"fourth fiber" with --fourth optical fiber--

Column 15, line 9, in Claim 26; replace:
"second angel" with --second angle--

Column 15, line 56, in Claim 31; replace:
"first input directions" with --first input direction--

Column 16, line 11, Claim 32; replace:
"directing the first polarized light" with
--directing the first polarized pump light--

Column 16, line 66, Claim 35; replace:
"reverse principal directions" with --reverse principal direction--

Column 18, line 12 in Claim 44; replace:
"a first birefringent having a first optical" with
--a first birefringent wedge having a first optical--

Column 18, line 50 in Claim 48; replace:
"wherein the second lens if adapted to direct" with
--wherein the second lens is adapted to direct--

UNITED STATES PATENT AND TRADEMARK OFFICE
CERTIFICATE OF CORRECTION

PATENT NO. : 6,900,933 B1
APPLICATION NO. : 10/131561
DATED : May 31, 2005
INVENTOR(S) : Wei-Zhong Li and Qingdong Guo It is certified that error appears in the above-identified patent and that said Letters Patent is hereby corrected as shown below:

Column 18, line 57 in Claim 49; replace:
"49. An integrated two-pump comprising:" with
--49. An integrated two pump combiner comprising:--

Signed and Sealed this

Twenty-sixth Day of December, 2006

JON W. DUDAS
*Director of the United States Patent and Trademark Office*